Feb. 14, 1950 W. M. VENNER ET AL 2,497,380
PISTON

Filed Oct. 5, 1945 2 Sheets-Sheet 1

INVENTORS
William M. Venner.
Percy L. Bowser.
BY Brunnige & Sutherland
ATTORNEYS Patented Feb. 14, 1950

2,497,380

UNITED STATES PATENT OFFICE 2,497,380

PISTON

William M. Venner, Clayton, and Percy L. Bowser, University City, Mo.

Application October 5, 1945, Serial No. 620,570

15 Claims. (Cl. 309—11)

This invention relates to pistons adapted particularly for internal combustion engines, and more particularly to pistons of the trunk type made of light metals such as aluminum or magnesium, or alloys thereof.

One of the objects of this invention is to provide a piston of the character described which is so constructed that its expansion may be controlled in order that it may be finished with a minimum of clearance and still maintain a good bearing fit in the cylinder at substantially all practical operating temperatures.

Further objects will appear from the detail description in which will be set forth an illustrative embodiment of this invention. It is to be understood, however, that this invention is susceptible of various embodiments, within the scope of the appended claims, without departure from the principle or spirit of this invention.

In the accompanying drawings, Figure 1 is a side elevation in the region of one of the bosses embodying this invention;

Generally stated and in accordance with this invention, the piston has one or more of its thrust faces partially separated from the head and the skirt is constructed to flex at its upper part relatively the remainder thereof. In the embodiment described the separation is by a part-circumferential slot or slots, and one or both of the piston faces are partially recessed to the head in the region of the boss or bosses, leaving a partially cylindrical bearing part or parts below the circumferential slot or slots. A retrograde slot extends from adjacent the end of a circumferential slot partly around the bearing part. The thrust face is oval-formed with the oval at the bearing part or parts less than that of the remainder of the thrust face therebelow.

Referring now to the accompanying drawings, 10 designates the piston head and 11 the skirt. The head, as usual, is provided with ring grooves 12 and is of smaller diameter than the skirt, and both head and skirt are provided with the usual tapers, the diameter being smaller at the top.

Pin bosses 13 are provided and are cast integrally with the skirt with the usual provision of ribs 14 from each boss to the head.

Figures 1, 2:
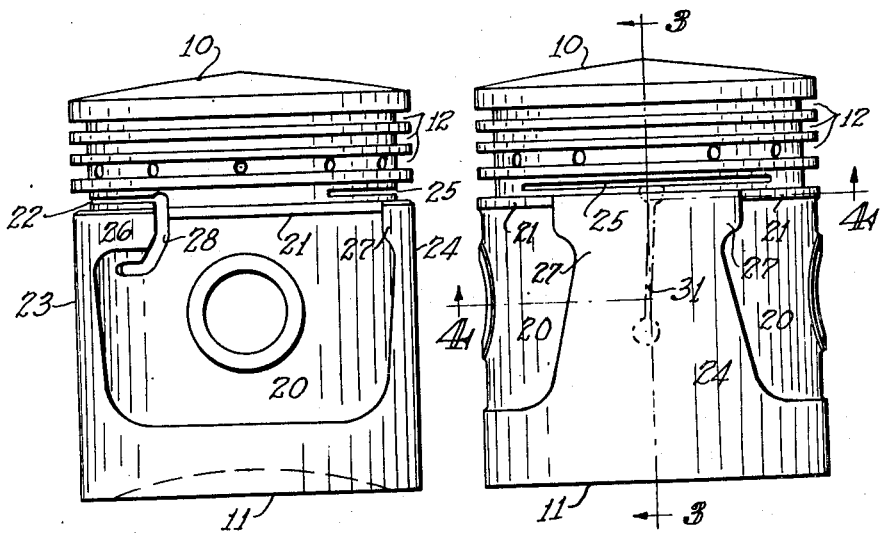
Figure 2 is an elevation of one of the thrust faces.
Figure 3:
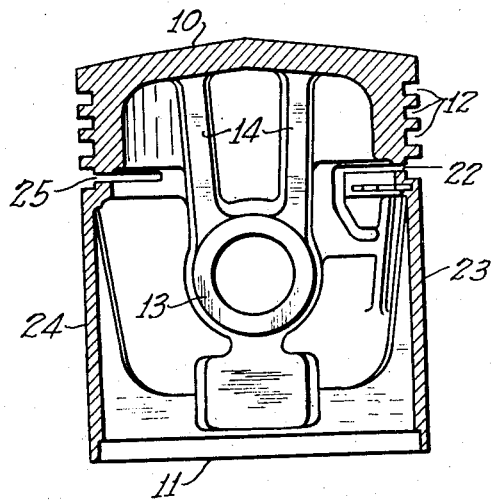
Figure 3 is a section on the line 3—3 of Figure 2.
Figure 4:
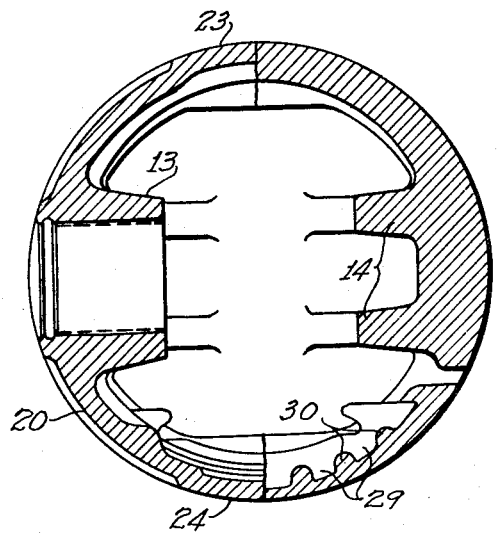
Figure 4 is a section on the line 4—4 of Figure 2.

The piston face is recessed in the regions of the bosses as shown at 20, and this recess extends to the head, although a rim 21 of slightly larger diameter than the recess but still well out of contact with the cylinder, may be provided. The head is partially separated from the skirt by a part-circumferential slot 22 partially separating one of the thrust faces 23 from the head, and the opposing thrust face 24 may also be provided by a part-circumferential slot 25, also partially separating that thrust face from the head. The thrust face 23 has a relatively long but partial cylinder-bearing part 26 left by the recessing in the region of the bosses and the thrust face 24 may have a relatively short but partial cylinder-bearing part 27, also left by such recessing. The retrograde slot 28 extends from adjacent of the circumferential slot 22 partially around the bearing part 26. The above construction may be duplicated on the opposite side of the piston as at the left in Figure 1, and as shown in Figure 3, reference Figure 1. The slot 25 may extend well beyond the short bearing part 27 on one or both sides of the piston at the right of Figure 1, where that construction may also be duplicated, as shown in Figure 3, reference Figure 1; that is, the thrust face 23 may have two wings 26 with slots 28, and the opposite thrust face 24 may have the short parts 27.

The top of the thrust face 23 in the region or regions of the cylinder-bearing part or parts may be provided with a control element 29 having a lower thermal coefficient of expansion than the piston metal, and this element may be constructed of steel, which is cheap and easily worked, or any other suitable metal having that characteristic. This element may be of the construction shown in Patent No. 2,240,966, May 6, 1941, and as shown here; that is, it may be a stamping of substantial radial depth in order to provide with the cylinder metal a thermostatic element. In order to so function in the piston, it may be provided with recesses 30, into which flows the metal of the piston when the latter is cast thereon. The construction is such that upon heating of the piston, the thermostatic action at the top will be as shown in the patent cited; that is, the skirt at the top will be drawn in at the corners of the wings 26. The thrust face 24 may be provided with a vertical slot 31 extending from the circumferential slot 25 and terminating short of the skirt of the piston.

Figure 5:
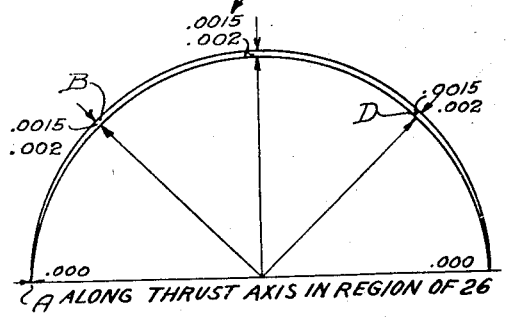
Figure 5 is a diagram showing the face formation of the piston which is below the circumferential slot.
Figure 6:
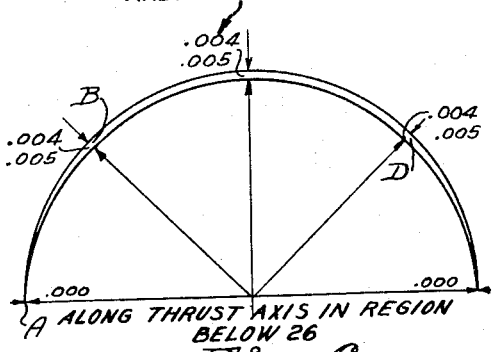
Figure 6 is a diagram showing the face formation of the remainder of the piston.

In accordance with this invention and as shown in Figures 5 and 6, the thrust face or faces are formed oval with, however, the oval in the region of the cylinder-bearing part 26, and which may also include the cylinder-bearing part 27, made as shown in Figure 5, less than that of the remainder of the thrust face therebelow, as shown in Figure 6. By this is meant that while in each of the Figures 5 and 6 the thrust face diameter of the piston is greater than its boss or wrist pin diameter, the difference between those diameters is less in Figure 5 than it is in Figure 6; that is, the oval in Figure 5 is less than it is in Figure 6. For example, in a piston designed for a cylinder 3.5 inches in diameter, the ovals may have the dimensions shown in Figures 5 and 6 with a head diameter 3.4 inches. These ovals may extend from A to B, but from B to D these ovals may merge into cylindrical surfaces. The outlines shown in Figures 5 and 6, of course, represent the theoretical surfaces generated by the grinding wheel compared to a true cylinder. On the piston, however, the portion from B to D is the recessed portion 20, and only the portion from A to B can contact the cylinder wall. Of the latter portion, the part 26 may have the full extent of the arc AB while the part 27 may be shorter as shown. Thus the critical contact points of the piston, namely the wing tips of the portion 26, may be given a minimum clearance when cold, while all other parts of the bearing surfaces have ample clearance for expansion. As the piston heats up, those wing tips are drawn inward by the action of the control element 29 so as to maintain a good fit at these points.

A piston constructed as described is of such a structure that the skirt may be finished close to the diameter of the cylinder and with a minimum of clearance, but it will still maintain a good bearing fit in the cylinder at all ordinary operating temperatures encountered. The relatively long bearing part 26 can have the small oval because the top of the skirt is permitted to flex by virtue of the formation of the retrograde slot 28; in fact, the cylinder-engaging face can be made substantially cylindrical and is so maintained by the control element 29. The relatively short bearing part 27 does not, however, require a retrograde slot. Any inequalities in the cylinder can be taken care of by the vertical slot 31.

The invention having thus been described, what is claimed is:

1. A trunk piston one of whose thrust faces is partially separated from the head by a part-circumferential slot and one of whose faces is partially recessed to clear the cylinder wall over an area extending to the head in the region of one of the bosses, leaving a partial cylinder-bearing part below said circumferential slot, a retrograde slot extending from adjacent the end of said circumferential slot partially around said bearing part, said thrust face being oval-formed with the oval at said bearing part less than that of the remainder of the thrust face therebelow.

2. A trunk piston one of whose thrust faces is partially separated from the head by a part-circumferential slot and both of whose sides are partially recessed to clear the cylinder wall over areas extending to the head in the regions of the bosses, leaving partial cylinder-bearing parts below said circumferential slot, retrograde slots extending from adjacent the ends of said circumferential slot partially around said bearing parts, said thrust face being oval-formed with the oval at said bearing parts less than that of the remainder of the thrust face therebelow.

3. A trunk piston one of whose thrust faces is partially separated from the head by a part-circumferential slot and one of whose faces is partially recessed to clear the cylinder wall over an area extending to the head in the region of one of the bosses, leaving a partial cylinder-bearing part below said circumferential slot and leaving a shorter cylinder-bearing part on the other thrust face and opposite said first bearing part, a retrograde slot extending from adjacent the end of said circumferential slot partially around said first bearing part, the thrust faces being oval-formed with the oval of said first bearing part less than that of the remainder of the thrust face therebelow.

4. A trunk piston one of whose thrust faces is partially separated from the head by a part-circumferential slot and both of whose sides are partially recessed to clear the cylinder wall over areas extending to the head in the regions of the bosses, leaving partial cylinder-bearing parts below said circumferential slot and leaving shorter cylinder-bearing parts on the other thrust face and opposite said first bearing parts, retrograde slots extending from adjacent the ends of said circumferential slot partially around said first bearing parts, said thrust faces being oval-formed with the ovals at said first bearing parts less than that of the remainder of the thrust faces therebelow.

5. A trunk piston whose thrust faces are partially separated from the head by part-circumferential slots and one of whose faces is partially recessed to clear the cylinder wall over an area extending to the head in the region of one of the bosses, leaving a relatively long and an opposite relatively short partial cylinder-bearing parts below said circumferential slots, a retrograde slot extending partially around said long bearing part from adjacent the end of its circumferential slot, the thrust faces being formed oval with the oval of said long bearing part less than that of the remainder of the skirt therebelow.

6. A trunk piston whose thrust faces are partially separated from the head by part-circumferential slots and whose faces are partially recessed to clear the cylinder wall over areas extending to the head in the regions of the bosses, leaving a pair of relatively long partial cylinder-bearing faces below one circumferential slot and a pair of relatively short cylinder-bearing faces below the other circumferential slot, retrograde slots extending partially around said long bearing parts from adjacent the ends of their circumferential slots, the thrust faces being formed oval with the ovals at said long bearing parts less than those of the remainder of the skirt.

7. A trunk piston whose thrust faces are partially separated from the head by part-circumferential slots and one of whose faces is partially recessed to clear the cylinder wall over an area extending to the head in the region of one of the bosses, leaving a relatively long and an opposite relatively short partial cylinder-bearing parts below said circumferential slots, a retrograde slot extending partially around said long bearing part from adjacent the end of its circumferential slot, a vertical slot extending from the circumferential slot adjacent the shorter bearing part, the thrust faces being formed oval with the oval of said long bearing part less than that of the remainder of the skirt therebelow.

8. A trunk piston whose thrust faces are partially separated from the head by part-circumferential slots and whose faces are partially recessed to clear the cylinder wall over areas extending to the head in the regions of the bosses, leaving a pair of relatively long partial cylinder-bearing faces below one circumferential slot and a pair of relatively short cylinder-bearing faces below the other circumferential slot, retrograde slots extending partially around said long bearing parts from adjacent the ends of their circumferential slot, a vertical slot extending from the circumferential slot adjacent the shorter bearing parts, the thrust faces being formed oval with the ovals at said long bearing parts less than those of the remainder of the skirt.

9. A trunk piston one of whose thrust faces is partially separated from the head by a part-circumferential slot and one of whose faces is partially recessed to clear the cylinder wall over an area extending to the head in the region of one of the bosses, leaving a partial cylinder-bearing part below said circumferential slot, a retrograde slot extending from adjacent the end of said circumferential slot partially around said bearing part, and an element embodied in said thrust face in the region of said bearing part and of lower coefficient of expansion, said thrust face being oval-formed with the oval at said bearing part less than that of the remainder of the thrust face therebelow.

10. A trunk piston one of whose thrust faces is partially separated from the head by a part-circumferential slot and both of whose sides are partially recessed to clear the cylinder wall over areas extending to the head in the regions of the bosses, leaving partial cylinder-bearing parts below said circumferential slot, retrograde slots extending from adjacent the ends of said circumferential slot partially around said bearing parts, and an element embodied in said thrust face in the region of said bearing parts and of lower coefficient of expansion, said thrust face being oval-formed with the oval at said bearing part less than that of the remainder of the thrust face therebelow.

11. A trunk piston one of whose thrust faces is partially separated from the head by a part-circumferential slot and one of whose faces is partially recessed to clear the cylinder wall over an area extending to the head in the region of one of the bosses, leaving a partial cylinder-bearing part below said circumferential slot and leaving a shorter cylinder-bearing part on the other thrust face and opposite said first bearing part, a retrograde slot extending from adjacent the end of said circumferential slot partially around said first bearing part, and an element embodied in said thrust face in the region of said long bearing part and of lower coefficient of expansion, the thrust faces being oval-formed with the oval of said first bearing part less than that of the remainder of the thrust face therebelow.

12. A trunk piston one of whose thrust faces is partially separated from the head by a part-circumferential slot and both of whose sides are partially recessed to clear the cylinder wall over areas extending to the head in the regions of the bosses, leaving partial cylinder-bearing parts below said circumferential slot and leaving shorter cylinder-bearing parts on the other thrust face and opposite said first bearing parts, retrograde slots extending from adjacent the ends of said circumferential slot partially around said first bearing parts, and an element embodied in said thrust face in the region of said long bearing parts and of lower coefficient of expansion, said thrust faces being oval-formed with the oval at said first bearing parts less than that of the remainder of the thrust faces therebelow.

13. A trunk piston of the character described, comprising, a head, a skirt, wrist pin bosses connected with said head and said skirt, said skirt having a thrust face separated from said head and constructed to flex at its upper part relatively the remainder thereof, said thrust face being oval-formed with the oval at the upper part less than that of the part therebelow.

14. A trunk piston of the character described, comprising, a head, a skirt, wrist pin bosses connected with said head and said skirt, said skirt having thrust faces separated from said head and constructed to flex at their upper parts relatively the remainder thereof, said thrust faces being oval-formed with the oval at the upper parts less than that of the parts therebelow.

15. A trunk piston of the character described, comprising, a head, a skirt, wrist pin bosses connected with said head and said skirt, said skirt having a thrust face separated from said head and constructed to flex at its upper part relatively the remainder thereof, and means including a rigid element extending and interlocked circumferentially along the upper part of said thrust face adapted to maintain the curvature thereof at varying engine temperatures, said thrust face being oval-formed with the oval at the upper part less than that of the part therebelow.

WILLIAM M. VENNER.
PERCY L. BOWSER.

REFERENCES CITED

The following references are of record in the file of this patent:

UNITED STATES PATENTS

| Number | Name | Date |
|---|---|---|
| 1,758,444 | Jehle et al. | May 13, 1930 |
| 1,927,611 | Moore | Sept. 19, 1933 |
| 2,221,535 | Berry | Nov. 12, 1940 |
| 2,240,967 | Venner et al. | May 6, 1941 |
| 2,240,968 | Venner et al. | May 6, 1941 |
| 2,262,132 | Berry | Nov. 11, 1941 |